(12) United States Patent
Detienne et al.

(10) Patent No.: US 11,513,826 B2
(45) Date of Patent: Nov. 29, 2022

(54) GENERATING APPLICATION PROGRAMMING INTERFACE BASED ON OBJECT MODELS FROM NETWORK DEVICES

(71) Applicant: Cisco Technology, Inc., San Jose, CA (US)

(72) Inventors: Frédéric René Philippe Detienne, Harze (BE); Piotr Jerzy Kupisiewicz, Cracow (PL)

(73) Assignee: CISCO TECHNOLOGY, INC., San Jose, CA (US)

( * ) Notice: Subject to any disclaimer, the term of this patent is extended or adjusted under 35 U.S.C. 154(b) by 38 days.

(21) Appl. No.: 17/241,493

(22) Filed: Apr. 27, 2021

(65) Prior Publication Data

US 2022/0261261 A1 Aug. 18, 2022

Related U.S. Application Data

(60) Provisional application No. 63/149,817, filed on Feb. 16, 2021.

(51) Int. Cl.
*G06F 9/44* (2018.01)
*G06F 9/455* (2018.01)

(52) U.S. Cl.
CPC .............................. *G06F 9/45512* (2013.01)

(58) Field of Classification Search
CPC .................................................. G06F 9/45512
USPC ........................................................ 719/328
See application file for complete search history.

(56) References Cited

U.S. PATENT DOCUMENTS

| 6,721,808 | B1 | 4/2004 | Singh |
| 7,039,724 | B1 | 5/2006 | Lavian et al. |
| 2014/0337467 | A1* | 11/2014 | Pech .................. G06F 9/45529 709/217 |
| 2016/0239274 | A1* | 8/2016 | Strachota ................. G06F 8/30 |
| 2016/0350095 | A1* | 12/2016 | Ramachandran ......... G06F 8/65 |

OTHER PUBLICATIONS

NPM, "simple-git", retrieved from Internet Apr. 27, 2021, 31 pages; https://www.npmjs.com/package/simple-git.

(Continued)

*Primary Examiner* — Timothy A Mudrick
(74) *Attorney, Agent, or Firm* — Edell, Shapiro & Finnan, LLC (57) ABSTRACT

Methods and systems provide a library of various language bindings for application programming interface enabled network devices. The library is generated on-demand based on respective capabilities of a target network device. In these methods, a computing device obtains a selection of a target network device among a plurality of network devices and one or more data models that represent capabilities of the target network device. The computing device generates a library of one or more object models, each of which respectively corresponds to one of the one or more data models. The one or more object models define command line options for interfacing with the target network device. In these methods, the computing device provides a language shell for interacting with the target network device based on the one or more object models in the library.

20 Claims, 6 Drawing Sheets

(56) References Cited

OTHER PUBLICATIONS

Lukas White et al., "Build a JavaScript Command Line Interface (CLI) wiitth Node.js", SitePoint, Feb. 6, 2020, 30 pages.
Idorenyin Obong, "Creating a dynamic application with LoopBack", LogRocket Blog, Mar. 26, 2020, 9 pages.
Tom Johnson, "Swagger UI tutorial | Documenting APIs", I'd Rather Be Writing, last updated Jun. 25, 2020, 25 pages.
Github, "OAI/OpenAPI-Specification: The OpenAPI Specification Repository", retrieved from Internet Apr. 27, 2021, 4 pages; https://github.com/OAI/OpenAPI-Specification.

* cited by examiner

FIG.1

```
>>> service.inventory[Edge1.example.com].netconf.xpath.
    .IOS_XE_aaa_oper                      .IOS_XE_dhcp_oper              .IOS_XE_mdt_oper
    .IOS_XE_acl_oper                      .IOS_XE_efp_oper               .IOS_XE_memory_oper
    .IOS_XE_app_hosting_cfg               .IOS_XE_eigrp_oper             .IOS_XE_mlppp_oper
    .IOS_XE_app_hosting_oper              .IOS_XE_environment_oper       .IOS_XE_mpls_forwarding_oper
    .IOS_XE_arp_oper                      .IOS_XE_fib_oper               .IOS_XE_nat_oper
    .IOS_XE_bfd_oper                      .IOS_XE_flow_monitor_oper      .IOS_XE_native
    .IOS_XE_bgp_oper                      .IOS_XE_gir_oper               .IOS_XE_ntp_oper
    .IOS_XE_boot_integrity_oper           .IOS_XE_gnss_oper              .IOS_XE_ospf_oper
    .IOS_XE_breakout_port_oper            .IOS_XE_ha_oper                .IOS_XE_platform
    .IOS_XE_cable_diag_oper               .IOS_XE_interfaces_oper        .IOS_XE_platform_oper
    .IOS_XE_cdp_oper                      .IOS_XE_ios_events_oper        .IOS_XE_platform_software_oper
    .IOS_XE_cellwan_oper                  .IOS_XE_ip_sla_oper            .IOS_XE_poe_oper
    .IOS_XE_cfm_oper                      .IOS_XE_ipv6_oper              .IOS_XE_ppp_oper
    .IOS_XE_checkpoint_archive_oper       .IOS_XE_linecard_oper          .IOS_XE_process_cpu_oper
    .IOS_XE_crypto_oper                   .IOS_XE_lisp_oper              .IOS_XE_process_memory_oper
    .IOS_XE_crypto_pki_oper               .IOS_XE_lldp_oper              .IOS_XE_rpc
    .IOS_XE_cts_rpc                       .IOS_XE_matm_oper              .IOS_XE_sm_events_oper
    .IOS_XE_device_hardware_oper          .IOS_XE_mdt_cfg                .IOS_XE_spanning_tree_oper
```

FIG.2

```
>>> request = service.inventory['Edge1.example.com'].netconf.xpath.ietf_interfaces.interfaces.get()
```

```
>>> request.result.raw
{
  "interfaces" : {
    "@xmlns": "urn:ietf:params:xml:ns:yang:ietf-interfaces",
    "interface": [
      {
        "name": "FortyGigabitEthernet1/1/1",
        "type": {"xmlns:ianaift": "urn:ietf:params:xml:ns:yang:iana-if-type", "#text": "ianaift:ethernetCsmacd"},
        "enabled": "true"
        "ipv4": { "@xmlns": "urn"ietf:params:xml:ns:yang:ietf-ip"},
        "ipv6": { "@xmlns": "urn"ietf:params:xml:ns:yang:ietf-ip"},
      },
      {
        "name": "FortyGigabitEthernet1/1/2",
        "type": {"xmlns:ianaift": "urn:ietf:params:xml:ns:yang:iana-if-type", "#text": "ianaift:ethernetCsmacd"},
        "enabled": "true"
        "ipv4": { "@xmlns": "urn"ietf:params:xml:ns:yang:ietf-ip"},
        "ipv6": { "@xmlns": "urn"ietf:params:xml:ns:yang:ietf-ip"},
      },
```

GENERATING APPLICATION PROGRAMMING INTERFACE BASED ON OBJECT MODELS FROM NETWORK DEVICES

CROSS-REFERENCE TO RELATED APPLICATION

This application claims the benefit of priority under 35 U.S.C. § 119(e) to U.S. Provisional Patent Application Ser. No. 63/149,817, entitled "DYNAMICALLY GENERATING APPLICATION PROGRAMMING INTERFACE AND INTERACTIVE COMMAND LINE INTERFACE BASED ON OBJECT MODELS FROM NETWORK DEVICES," filed on Feb. 16, 2021, which is hereby incorporated by reference in its entirety.

TECHNICAL FIELD

The present disclosure relates to computer networking.

BACKGROUND

Network architectures have grown increasingly complex. Monitoring, provisioning, and management of customer networks or enterprise networks are becoming increasingly cumbersome. To help with these tasks, there are systems that map a network application programming interface (API) to a language specific API. These systems map a specific application to a language (language binding) or provide a software development kit (SDK) around a network protocol e.g. YANG development kit (YDK). Because of various network complexities and since customer networks are deployed in unknown networking environments, for technical support, screen-scrapping of a command line interface (CLI) is still preferred over the API to perform these tasks.

DESCRIPTION OF EXAMPLE EMBODIMENTS

Overview

Briefly, methods are presented for developing an on-demand library for API-enabled devices. In these methods, various different data models are obtained on-demand from various different network devices and a library of various language bindings for different data models is generated and is used to provide a language shell for interacting with various network devices even by an inexperienced user.

A method is provided that includes a computing device obtaining a selection of a target network device among a plurality of network devices and obtaining one or more data models that represent capabilities of the target network device. The method further includes the computing device generating a library of one or more object models, each of which respectively corresponds to one of the one or more data models. The one or more object models define command line options for interfacing with the target network device. This method further includes the computing device providing a language shell for interacting with the target network device based on the one or more object models in the library.

Example Embodiments

Networking Subject Matter Experts (SMEs) are reluctant to use equipment data models and API's in their day-to-day tasks because some APIs are complex, such as Network Configuration Protocol (Netconf). Even simpler APIs, such as Representational State Transfer (REST) API, may be difficult in unknown environments of the customer networks. For example, API troubleshooting can be very complex because it involves deploying test scripts in unknown environments. The rarity and complexity make these cases problematic to resolve. Typically, only programmers use the APIs because they code regularly, are familiar with network APIs, Task Description Language (TDL) compilers, Extensible Markup Language (XML), or other serialization formats, and the art of transforming data from one language to another e.g. from XML to Python structures or dictionaries. As a result, the networking community (network engineers, operators, and/or technical support) is slow in adopting APIs. Instead, the networking community performs a substantial amount of the low-level automation work by screen-scraping a CLI with regular expressions.

Techniques presented herein generate an interactive console that connects to various networks that include multiple network devices and that provide command line options in simple notations based on the capabilities of a target network device. Specifically, capabilities of the target device are obtained using APIs (OpenAPI, Netconf, or others). Based on these capabilities, a library of object models (command line options) is generated. An interactive console uses the library and makes modeled data easy to consume by inexperienced users. A technician may be equipped with just scripting knowledge and comfortably use the interactive console. The techniques presented herein dynamically expand syntax based on an object model of the target device and provide various object models from an assisted CLI.

Figure 1:
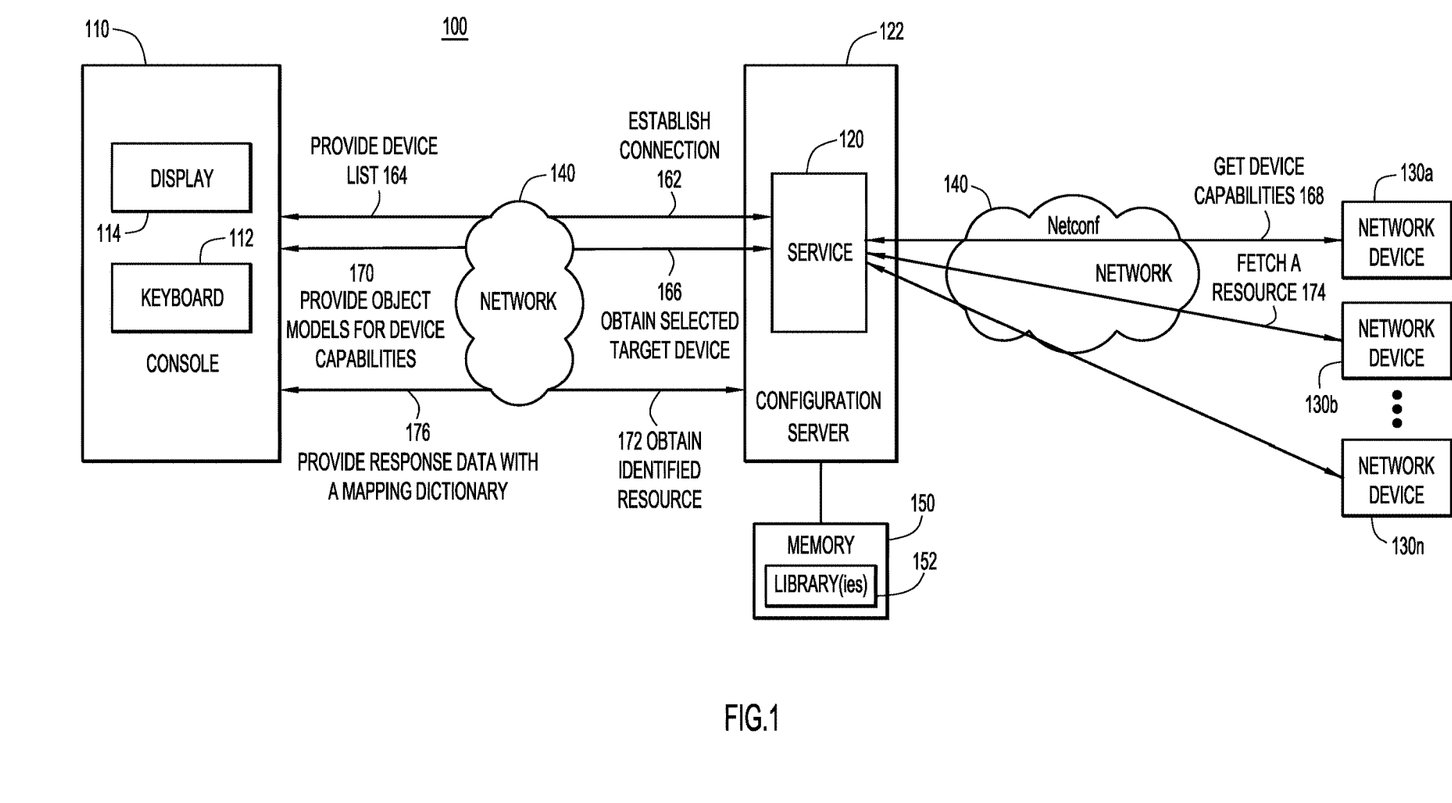
FIG. 1 is a block diagram illustrating a system for generating an interactive console based on data models obtained from one or more network devices, according to an example embodiment.

FIG. 1 is a block diagram illustrating a system 100 for generating an interactive console based on data models obtained from one or more network devices, according to an example embodiment. The system 100 includes a console 110, a service 120 running on a server, such as configuration server 122, network devices 130*a-n*, networks 140, and a memory 150. The notation "a-n" denotes that a number is not limited, can vary widely, and depends on a particular use case scenario. This is an example of the system 100 and number of entities and types would vary based on a particular deployment and use case scenario.

The entities (nodes, network devices, computing devices, etc.) of the system 100 communicate via the one or more networks 140. The one or more networks 140 may include a local area network (LAN), a wide area network (WAN) such as the Internet, or a combination thereof, and includes wired, wireless, or fiber optic connections. In general, the one or more networks 140 can use any combination of connections and protocols that support communications between the entities of the system 100.

In various example embodiments, the entities of the system 100 (the console 110, the configuration server 122, and the network devices 130a-n) may each include a network interface, at least one processor, and a memory. Each entity may be any programmable electronic device capable of executing computer readable program instructions. The network interface may include one or more network interface cards that enable components of the entity to send and receive data over the one or more networks 140. Each entity may include internal and external hardware components such as those depicted and described in further detail in FIG. 6.

The console 110 is a computer device or a client device. The console 110 includes a user interface (e.g., a keyboard 112) configured to obtain command input from an operator and configured to provide command output to the operator (e.g., via a display 114). The console 110 communicates with and/or configures one or more of the network devices 130a-n, via the service 120, using a secure shell (SSH) connection, for example. The console 110 requests data and/or action(s) from the network devices 130a-n by providing commands via the user interface in a standardized form and obtaining data or results from the network devices 130a-n as command output on the display 114. The output is also provided in a standardized form for ease of understanding. The console 110 is an interactive shell that allows an operator to obtain information from various network devices 130a-n without understanding various, different APIs associated with these network devices 130a-n. The console 110 provides various command line options including tab completion and parameters, which are dynamically generated based on a target's capabilities by parsing various data models such as OpenAPI, Netconf, or others. In one example, the console 110 may be a Universal Multi-Vendor Command Line interface that communicates with any system supporting standard and non-standard data models.

The console 110 may generate a script or a playbook, which is an automated process for deploying the method of procedure (e.g., executing, on specific devices, the operations to configure or obtain various data such as configuration parameters, telemetry data, and so on from the specific devices).

The service 120 may optionally include a database. The configuration server 122 may be a controller that configures, manages, and monitors the network devices 130a-n. The service 120 running on the configuration server 122 may include one or more modules or units to perform various functions of example embodiments described below. The service 120 may be implemented by any combination of any quantity of software (and/or hardware modules or units), and may reside within memory of the configuration server 122 for execution by a processor of the configuration server 122. The configuration server 122 may be connected to, or otherwise in communication with, the memory 150.

The memory 150 may be external and remote from the configuration server 122. The memory 150 may directly connect to the configuration server 122 or via the networks 140. The memory 150 is configured to store a database of one or more libraries 152 that include data models described in detail below. The memory 150 may store data models in JavaScript Object Notation (JSON) and/or Extensible Stylesheet Language Transformations (XSLTs). These data models are dynamically and interactively generated, based on users' requests, using various different APIs associated with various network devices 130a-n, and are then stored in the memory 150.

The service 120 may enable a user, such as a network operator, to add, remove, and edit methods or procedures, which include operations that can be executed on the network devices 130a-n to perform maintenance, change configurations, gather telemetry data, or troubleshoot. The service 120 may transmit operations to the network devices 130a-n for execution and may obtain information about the network devices 130a-n. When the service 120 receives instructions from an operator (e.g., via the console 110), the instructions (commands) may be transmitted to one or more devices (e.g., network devices 130a-n) and executed locally on these network devices 130a-n. The results or output of the instructions (called command output or response data) are then provided to the console 110 via the service 120. According to one example embodiment, the console 110 and the service 120 may be integrated into a single computing device such as the configuration server 122 or a network controller.

The network devices 130a-n are electronic or computing devices used in networking such as networking equipment, a network node, a network management device, a network controller, and so on. These devices are typically used (a) to transmit and receive data between various endpoint devices, such as routers, switches, and hubs and/or (b) to control and configure the transmission of data among various devices in the network such as a network controller, a network management device, and a Digital Network Architecture Center (DNAC). The network devices 130a-n may include line cards or stand-alone instances of one or more of switches, routers, gateways, repeaters, access points, traffic classifiers, firewalls, intrusion detectors, and the like.

While only one service 120 is depicted in FIG. 1, the number of the services may depend on a particular configuration of the system 100. For example, there may be multiple services (multiple configuration servers or network controllers), each connected to a respective set of the network devices 130a-n. In one example embodiment, a respective network controller with connected network devices 130a-n may form a client/customer network, which then connects to the console 110 via the service 120. In another example embodiment, the console 110 may connect to various services to interface with various client networks. Each client/customer network has its own environment that is unknown to the console 110 at the time of connection. Techniques presented herein allow the console 110 to interact with various client/customer networks that have different network devices 130a-n) via the service 120 without specific knowledge of various APIs associated with the network devices 130a-n. The console 110 gains access to the library(ies) 152 stored in the memory 150 and using the service 120, the console 110 obtains data from the network devices 130a-n and/or controls/configures the network devices 130a-n.

Specifically, at 162, the console 110 establishes a connection with the service 120 using Netconf, for example. At 164, the console 110 obtains, via the service 120, a list of network devices 130a-n. At 166, the console 110 receives a user selection of a target device (e.g., the network device 130a) from a list of devices displayed on the display 114 and requests capabilities of the selected target device 130a. The target device 130a may be selected using) (PATH requests. The request includes an identifier of the target device 130a e.g. device "X" or "Edge1". In one example, capabilities of the target device 130a may be requested using NetconfGet-Capabilities protocol message.

In response to receiving the request for the capabilities of the target device 130a, the service 120 connects to the target device 120a using Netconf and downloads the capabilities list of the target device 130a. The service 120 then computes a hash of the capabilities list and queries/checks whether the hash is stored locally. If the hash is not stored at the service 120, the service 120 queries the memory 150 to determine if the hash is stored therein. If the capabilities list is already present and is current, then the service 120 locally obtains/downloads the actual capabilities of the target device 130a (from a local cache and/or from the memory 150).

Otherwise, at 168, the service 120 connects to the target device 130a e.g., using Netconf, and obtains actual capabilities of the target device 130a. The capabilities may be downloaded from the target device 130a using lmservice.netconf_runner.NetconfRunner.get_schema( ) method, for example. The capabilities may further include information about the target device 130a such as a version or type of the device and a data model version.

The service 120 then proceeds to obtain data models, such as YANG models, for the capabilities of the target device 130a. In existing solutions, the operator, based on the capabilities list obtained from a network device, needs to manually search for various data models that correspond to various capabilities of the network device, and then, based on these manually located data models, learns the data models and structures the requests/queries to the target device. In an example embodiment, on the other hand, the service 120 obtains various data models for the capabilities of the target device. The service 120 converts these data models (e.g. in a form of a YANG tree) into object models in a form of a JSON tree, for example, for ease of understanding even by an unskilled operator.

The service 120 generates the library 152 that includes various different object models corresponding to the data models of the target device 130a. The service 120 communicates with the network devices 130a-n using their native language and data models. The service 120 then builds a standardized library (object models) to aid an operator via the console 110. In particular, the service 120 parses the capabilities of the device (using data models) and converts them into a simple format such as JSON format that is easy to understand. Various standard and non-standard data models are converted into a unified library 152 that serves as a dictionary of commands. The service 120 compiles and caches these data models for use by the console 110. At 170, the device capabilities are provided in a form of object models (a standardized form) to the console 110. The standardized form is easy to understand even by an inexperienced operator that is unfamiliar with various APIs of the network devices 130a-n.

Based on the library 152 stored in the memory 150, the console 110 obtains a capabilities tree, for example, using lmconsole.xpath.LMXPath( ). The operator, via the console 110, interacts with the network devices 130a-n using command form that includes tab completion regardless of the type of the target network device or its APIs. In a given example, the console 110 can request Netconf data by using get( ) method on any node of lmconsole.xpath.LMXPath( ) instance. This causes NetconfGetXpaths to be used. This request is handled by the service 120 and a Netconf connection to the target device 130a itself. Additionally, response data (results/command output) coming from the target device 130a (via Netconf) in a form of XML data, for example, is converted into JSON by using the library e.g., xmltodict library.

In existing solutions, engineers are using: (1) Swagger web pages to troubleshoot a data management and command controller (Swagger is an Interface Description Language for describing RESTful APIs expressed using JSON), (2) "putty" to manage a switch, (3) a web browser to troubleshoot through a user interface, (4) Swagger web pages to troubleshoot the system through an API, and (5) a Netconf tool to communicate with some of the network devices 130a-n. Using all these different tools is troublesome and requires knowledge of each system. In an example embodiment, the service 120, on the other hand, integrates these various APIs into standardized libraries of object models by consuming data models of these various tools.

At 172, an operator may use the console 110 to identify a resource of interest e.g., a Swagger path or a YANG path. At 174, the service 120, using the library in the memory 150, fetches the resource (requested data) from the target device 130a. The service 120 compiles the data into basic, language-specific structures that are easy to use and understand. For example, the service 120 queries given)(Paths on the target device 130a (XPath is a major element in the XSLT standard). The service 120 compiles response data from the target device 130a into basic, language-specific structures that are easy to understand. At 176, the service 120 returns, to the console 110, a dictionary that maps the)(Paths of the target device to their output (response data).

Figure 2:
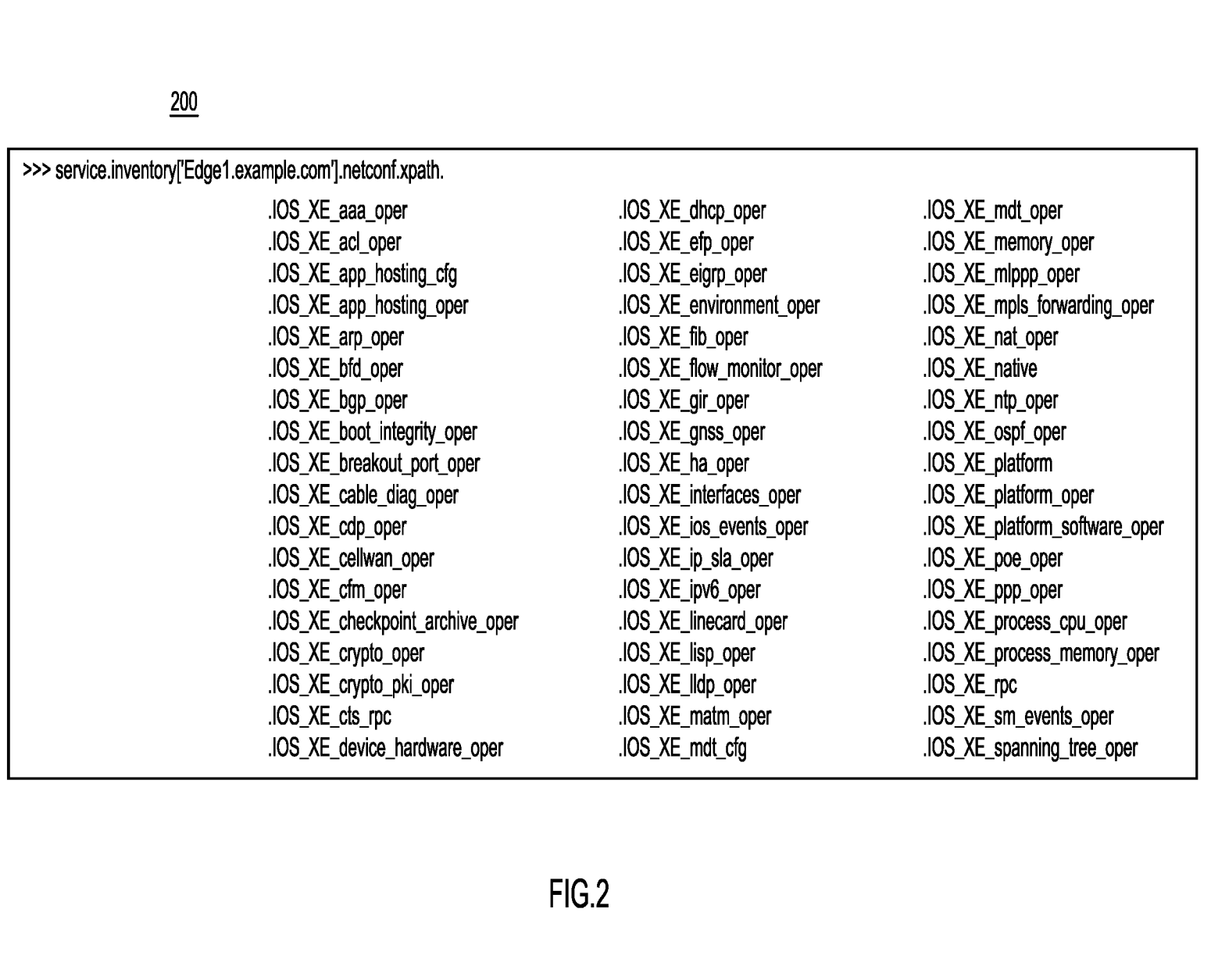
FIG. 2 is a diagram illustrating a CLI reflecting a dynamically generated application programming interface for interacting with a target device based on consumed data models, according to an example embodiment.

FIG. 2 is a diagram illustrating a CLI 200 reflecting a dynamically generated API for interacting with a target device based on consumed data models, according to an example embodiment.

Specifically, the console 110 provides an API whereby an operator points to a network device of interest such as the target device 130a. Based on capabilities of the target device 130a (e.g., version, data model version, etc.), the service 120 downloads data models from the target device 130a (e.g. using YANG or another Interface Description Language (IDL) or CORBA), compiles, and caches the data models. The service 120 generates an API. This API is then reflected into the CLI 200.

In one example embodiment, the CLI 200 is a user interface displayed on the display 114 of the console 110 of FIG. 1. In another example embodiment, the CLI 200 is a Netconf CLI/API displayed on the display 114. In both examples, the CLI 200 reflects the auto-generated API.

The CLI 200 may then include a set of APIs including one or more dynamically generated APIs. The CLI 200 outputs the data models in a simple format (object models) providing auto command completion and assistive typing functionalities. Syntax that is compliant with a target language such as "." (dot) and "[ ]" (bracket) notations may also be provided.

The CLI 200 includes generated object models and is a language shell and/or a dictionary of various command line options that are provided in the JSON format for easy understanding by an inexperienced operator.

Figure 3:
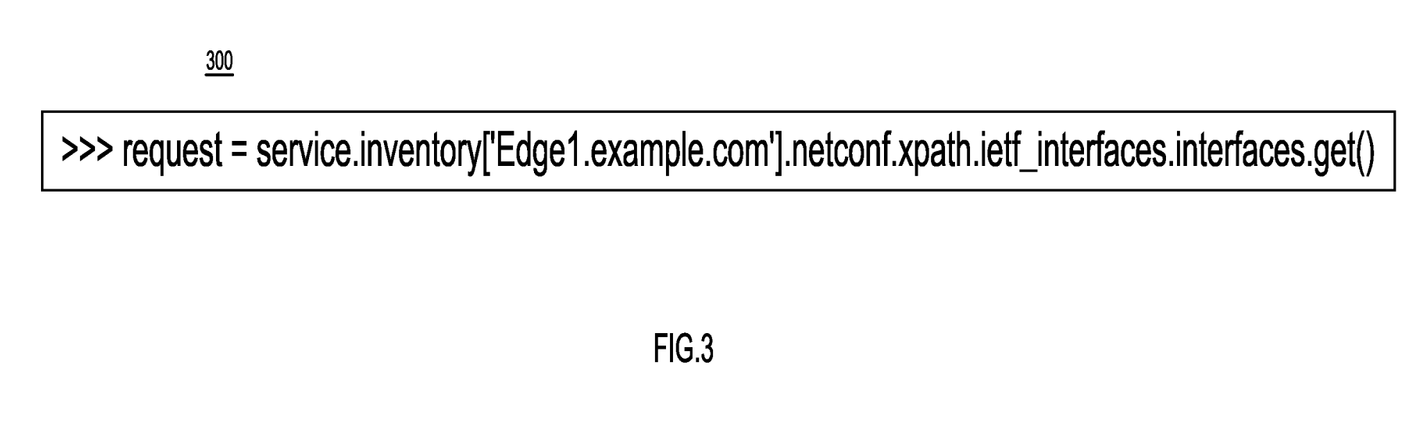
FIG. 3 is a diagram illustrating a CLI for making a specific query to a target device based on the generated command line options for the target device, according to another example embodiment.

FIG. 3 is a diagram illustrating CLI 300 for making a specific query to a target device based on command line options provided in the CLI 200 of FIG. 2, according to an example embodiment. The CLI 300 uses the CLI command interfaces.get( ) for specifying a resource of interest of the target device 130. That is, the operator may identify a resource of interest of the target device 130*a* such as "netconf.xpath . . . ".

Figure 4:
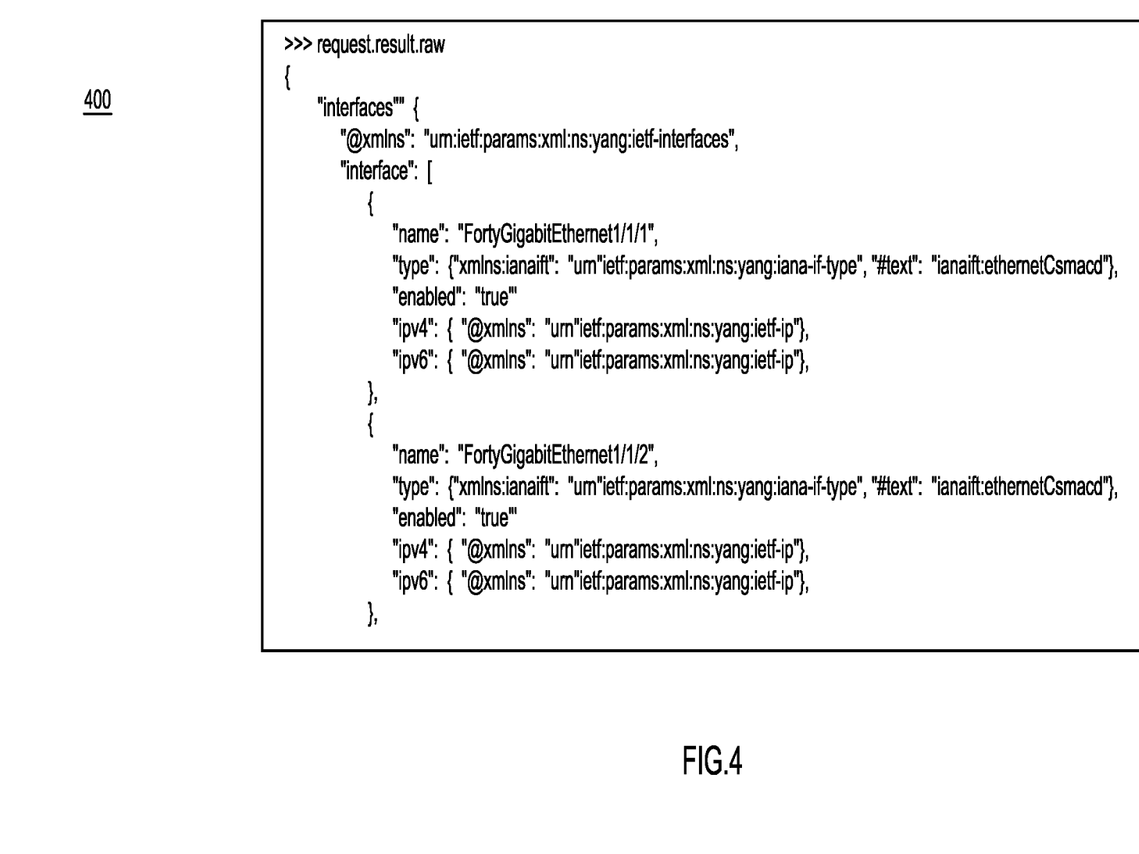
FIG. 4 is a diagram illustrating a CLI for providing structured data for a response output from a target device, according to an example embodiment.

FIG. 4 is a diagram illustrating CLI 400 for providing a structured data of a response data (results) from the target device 130*a*, according to an example embodiment. The CLI 400 provides data structure for the results in a JSON format. In one example embodiment, the CLI 400 is a data structure explaining the response data and may be provided in a JSON format. The operator uses the CLI 400 for analyze the response from the target device 130*a*.

As shown in FIGS. 2-4, the console 110 helps the operator to navigate through a data model tree as well as response data. For example, since YANG and Swagger data models and output or response data are consumed, the console 110 is configured to provide tab completion to navigate the object models (to set up a query) and the response data (to analyze the output). Response data is made available as if it were a Python dictionary, allowing the operator to quickly onboard and start using structured data instead of screen scraping. Using the console 110, the operator may easily tests a system API by providing CLI-type troubleshooting as opposed to deploying test scripts. The usability is improved by providing an assistive-typing console to help the user understand and rapidly prototype with data models and is useful for testing APIs in constrained environments.

According to another example embodiment, an operator may select GitHUB as a target device. Since GitHUB supports OpenAPI and Swagger, the service 120 automatically discovers commit, add, push, and addRemote methods (capabilities of GitHUB), without any coding beforehand. The service 120 then dynamically adopts to changes in various data models without changing one or more libraries of the network devices 130*a-n*. The service 120 consumes the GitHub commands and the console 110 provides a simplified notation to query data from GitHUB and to navigate the structured responses obtained from GitHUB.

The techniques presented herein consume data models of various network devices and dynamically generate an interactive console. The interactive console is configured to obtain data from multiple different data sources, which may then be compared and worked on using the interactive console. For example, an operator may download a routing table from a first network (the target device 130*a*) such as a switch using Netconf, from a second network device 130*b* (a different type of switch) using a CLI, and from a third network device 130*n* (a data network controller) using OpenAPI/Swagger. An operator can analyze and/or compare these results (response data) directly in the console 110 using language specific data structures, as dictionaries. Optionally, these data may be normalized to facilitate the comparison.

The techniques presented herein provide a service in a form of one or more service applications (the service 120) that consume YANG models, prepare a hierarchical object tree, and provide for a tab completion of the YANG models. The service 120 connects (using Netconf as an example) to one or more of the network devices 130*a-n* and obtains capabilities lists, YANG models, issues XPath requests to the network devices 130*a-n*, and converts the YANG tree into a JSON tree for the console 110.

The techniques presented herein are configured to operate with different versions of the same data models across any type of devices without requiring compilation, task description language (TDL), explicit data translation/conversion. These techniques provide fully expanded path in a native data model notation to help the user grow from this assisted system to more industrial methodologies.

Figure 5:
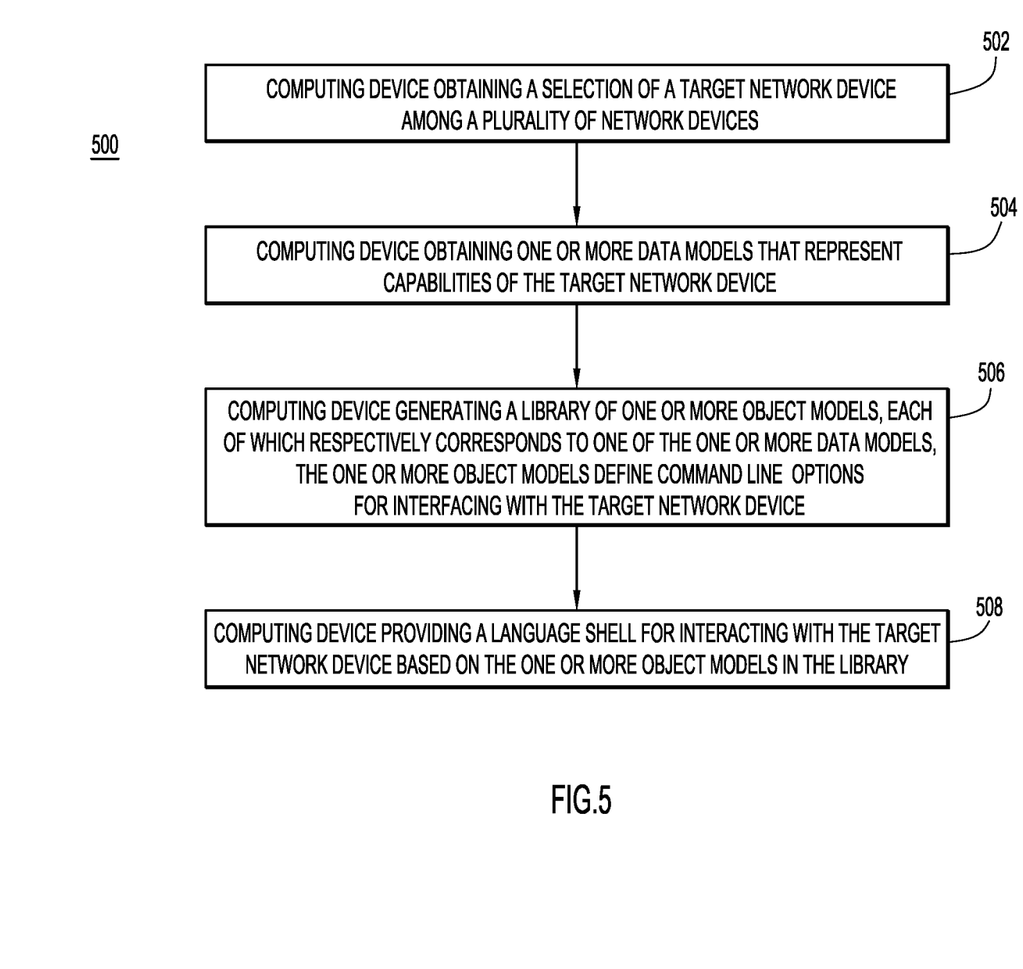
FIG. 5 is a flow diagram illustrating a method of providing a language shell for interacting with a selected target network device based on object models of a generated library, according to an example embodiment.

FIG. 5 is a flow diagram illustrating a method 500 of providing a language shell for interacting with a selected target network device based on object models from a generated library, according to an example embodiment. The method 500 may be implemented by a service application hosted on a computing device such as the service 120 of FIG. 1.

At 502, the method 500 involves a computing device obtaining a selection of a target network device among a plurality of network devices.

At 504, the method 500 involves the computing device obtaining one or more data models that represent capabilities of the target network device.

At 506, the method 500 involves the computing device generating a library of one or more object models. Each of these object models respectively corresponds to one of the one or more data models. These object models define command line options for interfacing with the target network device.

At 508, the method 500 involves the computing device providing a language shell for interacting with the target network device based on the one or more object models in the library.

In one form, the method 500 may further involve the computing device identifying a target resource of the target network device based on input obtained using the language shell and obtaining, from the target network device, response data for the target resource. The method 500 may further involve the computing device parsing the response data to define a data structure for the response data and providing the response data and the data structure.

In the method 500, the operation 506 of generating the library of the one or more object models may include generating auto-completion and assistive typing for the command line options.

In one instance, the operation 502 of obtaining the selection of the target network device may include obtaining the selection of a first target network device and a second target network device, of the plurality of network devices. The first target network device has a first application programming interface different from a second application programming interface of the second target network device.

According to one or more example embodiments, the first application programming interface includes a first set of data models that represents the capabilities of the first target network device and the second application programming interface includes a second set of data models that represents the capabilities of the second target network device. The operation 506 of generating the library may further include generating a plurality of object models that include a first language binding for the first application programming interface and a second language binding for the second application programming interface.

In one instance, at least one of the first application programming interface or the second application programming interface includes custom data models specific to a particular network device of the plurality of network devices.

In one form, the first target network device is configured to transmit network traffic in a communication network and the second target network device is configured to control the communication network. The method 500 may further involve the computing device obtaining, from at least one of the first target network device or the second target network device, language-specific response data and determining a data structure of the language-specific response data based on the library. The method 500 may further involve the computing device providing, to a user console, the data structure and the language-specific response data.

According to one or more example embodiments, the operation 506 of generating the library may include generating a hierarchical object tree based on the capabilities of the target network device.

In the method 500, the operation 504 of obtaining the one or more data models is executed by the computing device in response to obtaining the selection of the target network device. The method 500 may further involve downloading the one or more data models from the target network device.

Figure 6:
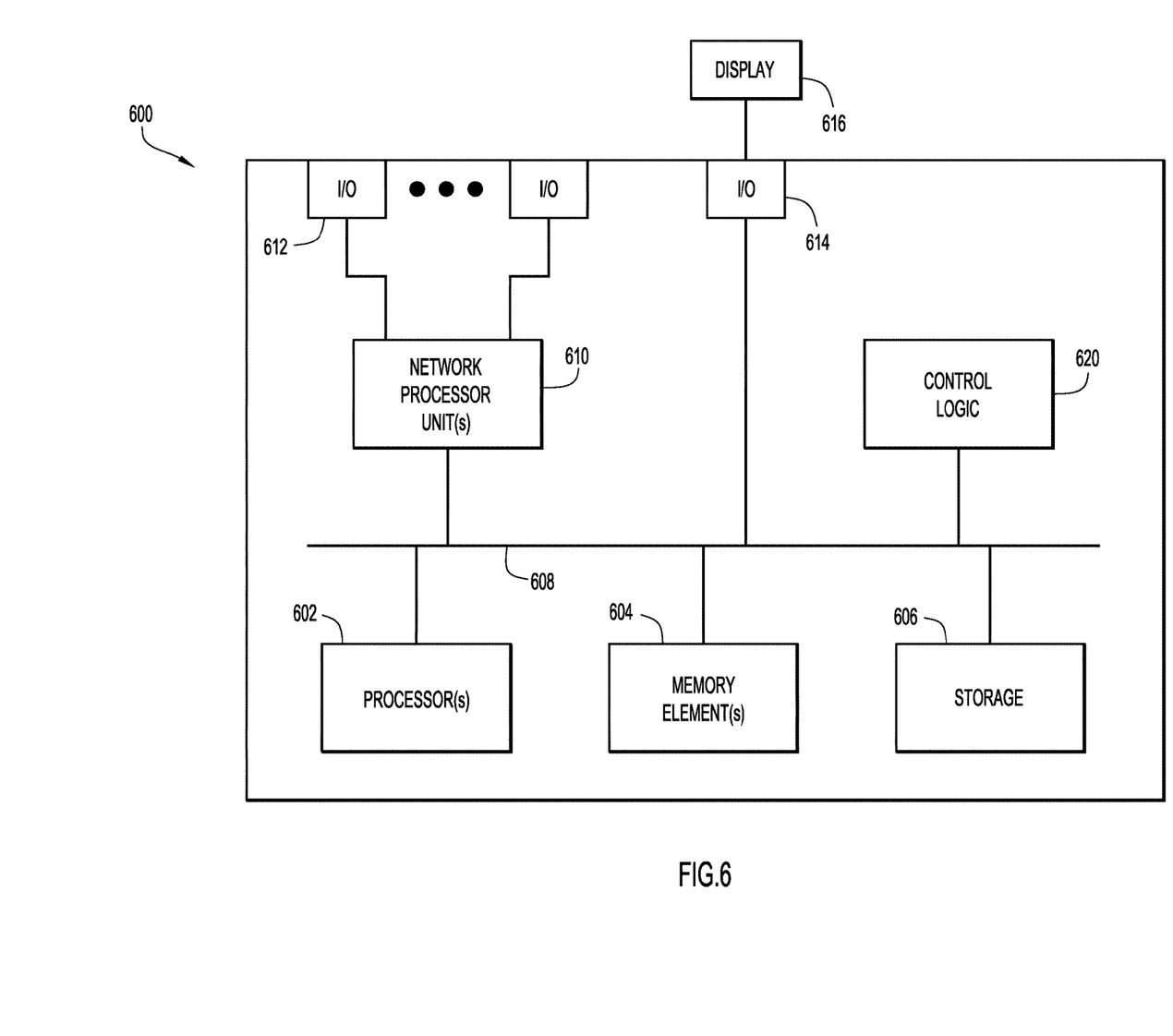
FIG. 6 is a hardware block diagram of a computing device that may perform functions associated with any combination of operations in connection with the techniques depicted and described in FIGS. 1-5, according to various example embodiments.

FIG. 6 is a hardware block diagram of a computing device 600 that may perform functions associated with any combination of operations in connection with the techniques depicted in FIGS. 1-5, according to various example embodiments, including, but not limited to, operations of the console 110 and/or the service 120. Further, the computing device 600 may be representative of one of the network devices 130a-n. It should be appreciated that FIG. 6 provides only an illustration of one embodiment and does not imply any limitations with regard to the environments in which different embodiments may be implemented. Many modifications to the depicted environment may be made.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with one or more memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like, shown at 616 in FIG. 6.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided such as the service 120 of FIG. 1 or the computing device 600 of FIG. 6. The apparatus includes a memory, a network interface configured to enable network communications and a processor. The processor is configured to perform various operations. The operations include obtaining a selection of a target network device among a plurality of network devices and obtaining one or more data models that represent capabilities of the target network device. The operations further include generating a library of one or more object models. Each of these object models respectively corresponds to one of the one or more data models. The one or more object models define command line options for interfacing with the target network device. The operations further include providing a language shell for interacting with the target network device based on the one or more object models in the library.

In one form, the processor may further be configured to perform identifying a target resource of the target network device based on input obtained using the language shell and obtaining, from the target network device, response data for the target resource. The processor may further be configured to perform parsing the response data to define a data structure for the response data and providing the response data and the data structure.

According to one or more example embodiments, the processor may be configured to perform the operation of generating the library of the one or more object models by generating auto-completion and assistive typing for the command line options.

In another form, the processor may be configured to perform the operation of obtaining the selection of the target network device by obtaining the selection of a first target network device and a second target network device, of the plurality of network devices. The first target network device has a first application programming interface different from a second application programming interface of the second target network device.

In one instance, the first application programming interface includes a first set of data models that represents the capabilities of the first target network device. The second application programming interface includes a second set of data models that represents the capabilities of the second target network device. The processor may further be configured to perform the operation of generating the library by generating a plurality of object models that include a first language binding for the first application programming interface and a second language binding for the second application programming interface.

According to one or more example embodiments, at least one of the first application programming interface or the second application programming interface may include custom data models specific to a particular network device of the plurality of network devices.

In another form, the first target network device is configured to transmit network traffic in a communication network and the second target network device is configured to control the communication network. The processor may further be configured to perform obtaining, from at least one of the first target network device or the second target network device, language-specific response data, determining a data structure of the language-specific response data based on the library, and providing, to a user console, the data structure and the language-specific response data.

In yet another example embodiment, one or more non-transitory computer readable storage media encoded with instructions are provided. When the media is executed by a processor, the instructions cause the processor to execute a method involving obtaining a selection of a target network device among a plurality of network devices and obtaining one or more data models that represent capabilities of the target network device. The method further involves generating a library of one or more object models. Each of these object models respectively corresponds to one of the one or more data models. The object models define command line options for interfacing with the target network device. The method further involves providing a language shell for interacting with the target network device based on the one or more object models in the library.

In one instance, the method may further involve identifying a target resource of the target network device based on input obtained using the language shell, obtaining, from the target network device, response data for the target resource, parsing the response data to define a data structure for the response data, and providing the response data and the data structure.

According to one or more example embodiments, the operation of generating the library of the one or more object models may include generating auto-completion and assistive typing for the command line options.

In one form, the operation of obtaining the selection of the target network device may include obtaining the selection of a first target network device and a second target network device, of the plurality of network devices. The first target network device has a first application programming interface different from a second application programming interface of the second target network device.

According to one or more example embodiments, the first application programming interface may include a first set of data models that represents the capabilities of the first target network device. The second application programming interface may include a second set of data models that represents the capabilities of the second target network device. The operation of generating the library may include generating a plurality of object models that include a first language binding for the first application programming interface and a second language binding for the second application programming interface.

In one form, at least one of the first application programming interface or the second application programming interface may include custom data models specific to a particular network device of the plurality of network devices.

In another form, the first target network device may be configured to transmit network traffic in a communication network and the second target network device may be configured to control the communication network. The method may further involve obtaining from at least one of the first target network device or the second target network device, language-specific response data, determining a data structure of the language-specific response data based on the library, and providing, to a user console, the data structure and the language-specific response data.

According to one or more example embodiments, the operation of generating the library may include generating a hierarchical object tree based on the capabilities of the target network device.

In one instance, the operation of obtaining the one or more data models is performed in response to obtaining the selection of the target network device and may include downloading the one or more data models from the target network device.

In yet another example embodiment, a system is provided that includes the device and operations explained above with reference to FIGS. 1-6.

The programs described herein (e.g., control logic 620) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 606 and/or memory elements(s) 604 can store data, software, code, instructions (e.g., processor instructions), logic, parameters, combinations thereof, and/or the like used for operations described herein. This includes the storage 606 and/or memory elements(s) 604 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by a computing device, a selection of a target network device among a plurality of network devices;
   obtaining, by the computing device, one or more data models that represent capabilities of the target network device;
   generating, by the computing device, a library of one or more object models, each of which respectively corresponds to one of the one or more data models, wherein the one or more object models define command line options for interfacing with the target network device; and
   providing, by the computing device, a language shell for interacting with the target network device based on the one or more object models in the library.

2. The method of claim 1, further comprising:
   identifying, by the computing device, a target resource of the target network device based on input obtained using the language shell;
   obtaining, by the computing device from the target network device, response data for the target resource;
   parsing, by the computing device, the response data to define a data structure for the response data; and
   providing, by the computing device, the response data and the data structure.

3. The method of claim 2, wherein generating the library of the one or more object models comprises:
   generating auto-completion and assistive typing for the command line options.

4. The method of claim 1, wherein obtaining the selection of the target network device comprises:
   obtaining the selection of a first target network device and a second target network device, of the plurality of network devices, wherein the first target network device has a first application programming interface different from a second application programming interface of the second target network device.

5. The method of claim 4, wherein the first application programming interface includes a first set of data models that represents the capabilities of the first target network device and the second application programming interface includes a second set of data models that represents the capabilities of the second target network device, and generating the library further comprises:
   generating a plurality of object models that include a first language binding for the first application programming interface and a second language binding for the second application programming interface.

6. The method of claim 5, wherein at least one of the first application programming interface or the second application programming interface includes custom data models specific to a particular network device of the plurality of network devices.

7. The method of claim 5, wherein the first target network device is configured to transmit network traffic in a communication network and the second target network device is configured to control the communication network, and further comprising:
   obtaining, by the computing device from at least one of the first target network device or the second target network device, language-specific response data;
   determining, by the computing device, a data structure of the language-specific response data based on the library; and
   providing, by the computing device to a user console, the data structure and the language-specific response data.

8. The method of claim 1, wherein generating the library comprises generating a hierarchical object tree based on the capabilities of the target network device.

9. The method of claim 1, wherein obtaining the one or more data models is in response to obtaining the selection of the target network device and comprises:
   downloading the one or more data models from the target network device.

10. An apparatus comprising:
    a memory;
    a network interface configured to enable network communications; and
    a processor, wherein the processor is configured to perform operations comprising:
      obtaining a selection of a target network device among a plurality of network devices;
      obtaining one or more data models that represent capabilities of the target network device;
      generating a library of one or more object models, each of which respectively corresponds to one of the one or more data models, wherein the one or more object models define command line options for interfacing with the target network device; and providing a language shell for interacting with the target network device based on the one or more object models in the library.

11. The apparatus of claim 10, wherein the processor is further configured to perform:

identifying a target resource of the target network device based on input obtained using the language shell;

obtaining, from the target network device, response data for the target resource;

parsing the response data to define a data structure for the response data; and providing the response data and the data structure.

12. The apparatus of claim 11, wherein the processor is configured to perform the operation of generating the library of the one or more object models by generating auto-completion and assistive typing for the command line options.

13. The apparatus of claim 10, wherein the processor is configured to perform the operation of obtaining the selection of the target network device by:

obtaining the selection of a first target network device and a second target network device, of the plurality of network devices, wherein the first target network device has a first application programming interface different from a second application programming interface of the second target network device.

14. The apparatus of claim 13, wherein the first application programming interface includes a first set of data models that represents the capabilities of the first target network device and the second application programming interface includes a second set of data models that represents the capabilities of the second target network device, and the processor is configured to perform the operation of generating the library by:

generating a plurality of object models that include a first language binding for the first application programming interface and a second language binding for the second application programming interface.

15. The apparatus of claim 14, wherein at least one of the first application programming interface or the second application programming interface includes custom data models specific to a particular network device of the plurality of network devices.

16. The apparatus of claim 14, wherein the first target network device is configured to transmit network traffic in a communication network and the second target network device is configured to control the communication network, and the processor is further configured to perform:

obtaining, from at least one of the first target network device or the second target network device, language-specific response data;

determining a data structure of the language-specific response data based on the library; and providing, to a user console, the data structure and the language-specific response data.

17. One or more non-transitory computer readable storage media encoded with instructions that, when executed by a processor, cause the processor to execute a method comprising:

obtaining a selection of a target network device among a plurality of network devices;

obtaining one or more data models that represent capabilities of the target network device;

generating a library of one or more object models, each of which respectively corresponds to one of the one or more data models, wherein the one or more object models define command line options for interfacing with the target network device; and providing a language shell for interacting with the target network device based on the one or more object models in the library.

18. The one or more non-transitory computer readable storage media of claim 17, wherein the method further comprises:

identifying a target resource of the target network device based on input obtained using the language shell;

obtaining, from the target network device, response data for the target resource;

parsing the response data to define a data structure for the response data; and providing the response data and the data structure.

19. The one or more non-transitory computer readable storage media of claim 18, wherein generating the library of the one or more object models includes generating auto-completion and assistive typing for the command line options.

20. The one or more non-transitory computer readable storage media of claim 17, wherein obtaining the selection of the target network device includes:

obtaining the selection of a first target network device and a second target network device, of the plurality of network devices, wherein the first target network device has a first application programming interface different from a second application programming interface of the second target network device.

* * * * *